(12) United States Patent
Chang et al.

(10) Patent No.: US 6,445,499 B1
(45) Date of Patent: Sep. 3, 2002

(54) OPTICAL CIRCULATORS

(75) Inventors: Kok-Wai Chang, Los Altos; Kejian Guan; Yong Zhang, both of San Jose, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/476,610

(22) Filed: Dec. 31, 1999

(51) Int. Cl.[7] .............................. G02B 5/30; G02F 1/09
(52) U.S. Cl. .................. 359/484; 359/495; 359/496; 359/497; 359/282; 385/11; 385/31; 385/33
(58) Field of Search .................... 359/484, 495, 359/496, 497, 281, 282; 385/11, 31, 33

(56) References Cited

U.S. PATENT DOCUMENTS

| | | | |
|---|---|---|---|
| 4,221,460 A | | 9/1980 | Hepner et al. |
| 5,074,682 A | * | 12/1991 | Uno et al. ................. 385/33 |
| 5,317,655 A | * | 5/1994 | Pan .......................... 385/11 |
| 5,402,509 A | * | 3/1995 | Fukushima ............... 359/282 |
| 5,446,578 A | * | 8/1995 | Chang et al. ............. 359/484 |
| 5,557,692 A | * | 9/1996 | Pan et al. .................. 359/484 |
| 5,574,595 A | * | 11/1996 | Kurata et al. ............ 359/484 |
| 5,579,420 A | * | 11/1996 | Fukushima ................ 385/11 |
| 5,631,771 A | * | 5/1997 | Swan ....................... 359/484 |
| 5,706,371 A | * | 1/1998 | Pan .......................... 385/11 |
| 5,712,728 A | * | 1/1998 | Chen ....................... 359/496 |
| 5,734,762 A | * | 3/1998 | Ho et al. .................. 385/11 |
| 5,909,310 A | | 6/1999 | Li et al. |
| 5,917,643 A | * | 6/1999 | Watanabe et al. ......... 359/484 |
| 5,930,039 A | | 7/1999 | Li et al. |
| 5,982,539 A | * | 11/1999 | Shirasaki ................. 359/484 |

FOREIGN PATENT DOCUMENTS

| | | | | |
|---|---|---|---|---|
| EP | 848277 | * | 6/1998 | ............ 359/484 |
| JP | 58-116515 | * | 7/1983 | ............ 359/484 |
| JP | 6-258599 | * | 9/1994 | ............ 359/484 |

* cited by examiner

*Primary Examiner*—Ricky D. Shafer
(74) *Attorney, Agent, or Firm*—Lacasse & Associates, LLC

(57) ABSTRACT

An optical circulator having a dual fiber collimator and a single fiber collimator is described. The circulator provides a non-reciprocal functionality that directs input signals from a first fiber of the dual fiber collimator to the single fiber collimator. Input signals from the single fiber collimator are directed to a second fiber of the dual fiber collimator. The circulator includes birefringent wedges that change the angle of signals from the single fiber collimator to direct the signals to the second fiber of the dual fiber collimator. Because the circulator includes two collimators rather than three collimators, the circulator is more compact than a circulator having three collimators.

18 Claims, 3 Drawing Sheets

OPTICAL CIRCULATORS

FIELD OF THE INVENTION

The invention relates to optical communications devices. More particularly, the invention relates to an optical circulator for use with, for example, optical communications networks.

BACKGROUND OF THE INVENTION

An optical circulator is a passive, non-reciprocal optical device that can be found in many applications, for example, optical amplifiers, dispersion compensation devices, and bidirectional optical communications systems. Because optical circulators are common components in many optical networks and devices, it is desirable to have reliable and compact circulators in order to reduce the size and cost of the networks and devices. However, current optical circulators may not be as compact and reliable as possible.

For example, the circulator disclosed in U.S. Pat. No. 4,650,289 has an input or output port on each or four sides. Such a configuration requires optical fibers to be run in several directions in order to access the circulator. Thus, the circulator disclosed by U.S. Pat. No. 4,650,289 does not provide a compact and efficient device when multiple circulators are included in the device.

More compact optical circulators have been developed. For example, U.S. Pat. No. 5,204,771 discloses an optical circulator having ports on two sides. The optical circulator of U.S. Pat. No. 5,204,771 thus provides a more compact circulator that can be used more efficiently with multiple circulators. However, an improved optical circulator can be provided.

SUMMARY OF THE INVENTION

Optical circulators are disclosed. In one embodiment, a circulator includes a first birefringent wedge to pass optical signals traveling in a first direction without changing an optical path of the signals and to change an angle of the optical path for signals traveling in a second direction and a second birefringent wedge to pass optical signals traveling in the first direction without changing the optical path of the signals and to change the angle of the optical path for signals traveling in the second direction. The circulator also includes a non-reciprocal optical element between the first birefringent wedge and the second birefringent wedge.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

An optical circulator is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An optical circulator having a dual fiber collimator and a single fiber collimator is described. The circulator provides a non-reciprocal functionality that directs input signals from a first fiber of the dual fiber collimator to the single fiber collimator. Input signals from the single fiber collimator are directed to a second fiber of the dual fiber collimator. The circulator includes birefringent wedges that change the angle of signals from the single fiber collimator to direct the signals to the second fiber of the dual fiber collimator. Because the circulator includes two collimators rather than three collimators, the circulator is more compact than a circulator having three collimators.

Figure 1:
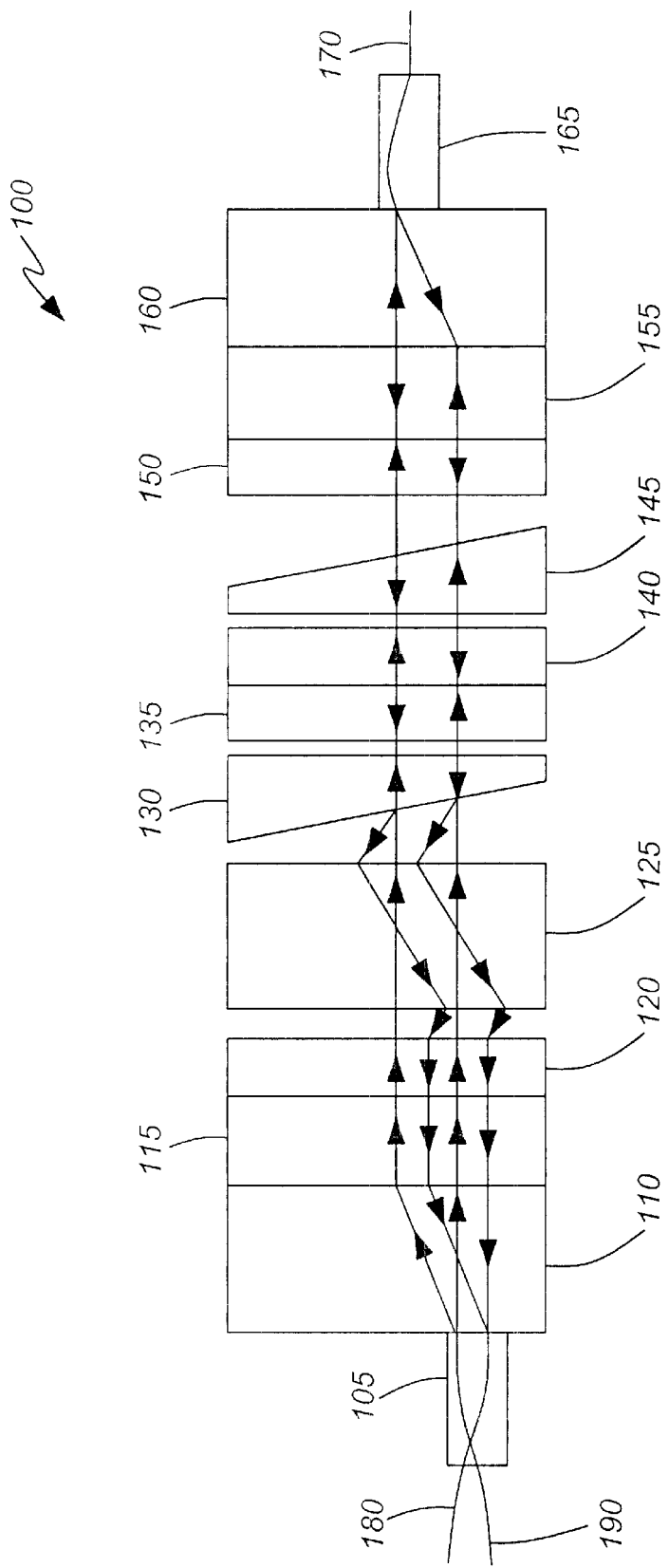
FIG. 1 illustrates a si view of one embodiment of an optical circulator.

FIG. 1 illustrates a side view of one embodiment of an optical circulator. The polarization states of the components described with respect to FIG. 1 are described in greater detail below with respect to FIGS. 2 and 3. The principle rays of the orthogonal polarized signals in a first direction from port 1 (190) to port 2 (170) and in a second direction from port 2 (170) to port 3 (180) are shown in FIG. 1. A single arrow designates the optical path in the first direction. A double arrow designates the optical path in the second direction. It should be noted that the optical paths between elements 130 and 160 are substantially the same.

In one embodiment, circulator 100 includes dual-port (or dual fiber) collimator 105 and single-port (or single fiber) collimator 165. In one embodiment, both dual port collimator 105 and single port collimator 165 include a collimating assembly having a GRIN lens to collimate the light. Other types of lenses can also be used, or pre-collimated light can be received.

For simplicity of description, collimator 105 is described as having an input port 190 and an output port 180. The circulator of FIG. 1 directs optical signals from the input port of collimator 105 to collimator 165. Signals input to collimator 165 are directed to the output port 180 of collimator 105. Circulator 100 thus provides non-reciprocal functionality for signals input to collimators 105 and 165.

Collimator 105 is optically coupled to optical displacement or walk-off crystal 110. In one embodiment, walk-off crystal 110 is a 45° walk-off crystal that splits the input signal from collimator 105 into two polarized optical signals and separates the two polarized signals by a predetermined distance. Because walk-off crystal 110 is a 45° walk-off crystal, the two polarized beams include a first beam having a 45° orientation and a second beam have a −45° orientation.

In one embodiment, half wave plate 115 changes the polarization of one of the two polarized signals by 90°. Half wave plate 115 has an azimuth angle of 45° with respect to optical signals passing from walk-off crystal 110 to Faraday rotator 120. Faraday rotator 120 rotates both polarized signals 45° in the counterclockwise direction.

Walk-off crystal 125 changes the path of polarized signals passing from collimator 165 to collimator 105, but does not change the path of polarized signals passing from collimator 105 to collimator 165. Birefringent wedge 130 similarly does not affect signals passing from collimator 105 to collimator 165. Birefringent wedge 130 changes the angle of signals passing from collimator 165 to collimator 105. In one embodiment, birefringent wedge 130 change the angle of signals passing from collimator 165 to 105 in the range of 1° and 5° (e.g., 1.8°); however, other angles can also be used. The angle directs optical signals from collimator 165 to the output fiber of collimator 105.

Faraday rotator 135 rotates both polarized optical signals by 45° in the counterclockwise direction. In one embodiment, half wave plate 140 has an azimuth angle in the range of 15° to 25° (e.g., 22.5°) with respect to optical signals passed from Faraday rotator 135 to birefringent wedge 145; however, other azimuth angles can also be used.

Birefringent wedge 145 does not change the angle of signals from collimator 105 to collimator 165, but birefringent wedge 145 does change the angle of signals from circulator 165 to circulator 105. Birefringent wedge 145 changes the angle of signals passing from collimator 165 to collimator 105. In one embodiment in the range of 1° and 5° (e.g., 1.8°); however, other angles can also be used.

Both polarized optical signals pass through half wave plate 150. In one embodiment, half wave plate 150 has an azimuth angle in the range of 15° to 25° (e.g., 22.5°); however, other azimuth angles can also be used. One of the optical signals passes through half wave plate 155. In one embodiment, half wave plate 155 has an azimuth angle in the range of 40° to 50° (e.g., 45°); however, other azimuth angles can also be used. Walk-off crystal 160 combines the two polarized optical signals. Collimator 165 receives the combined optical signal.

Optical signals input to collimator 165 are directed to a second port of collimator 105 by circulator 100. Walk-off crystal 160 separates the input signal into two polarized optical signals. Half wave plate 155 rotates one of the two polarized optical signals. Half wave plate 150 rotates both of the polarized optical signals.

Birefringent wedge 145 angles the two polarized optical signals passing from collimator 165 to collimator 105 to change the respective optical paths. Half wave plate 140 and Faraday rotator 135 both rotate the two polarized optical signals. Birefringent wedge 130 angles the two polarized optical signals. The group of optical elements including birefringent wedge 145, half wave plate 140, Faraday rotator 135 and birefringent wedge 130 operate to align input signals from collimator 165 with the output port of collimator 105.

Thus, optical signals that pass through circulator 100 are offset by a predetermined distance based on the direction in which the optical signals travel. The offset, in combination with the operation of half wave plates and Faraday rotators directs the optical signals between input and output ports to provide a non-reciprocal circulator function.

Figure 2:
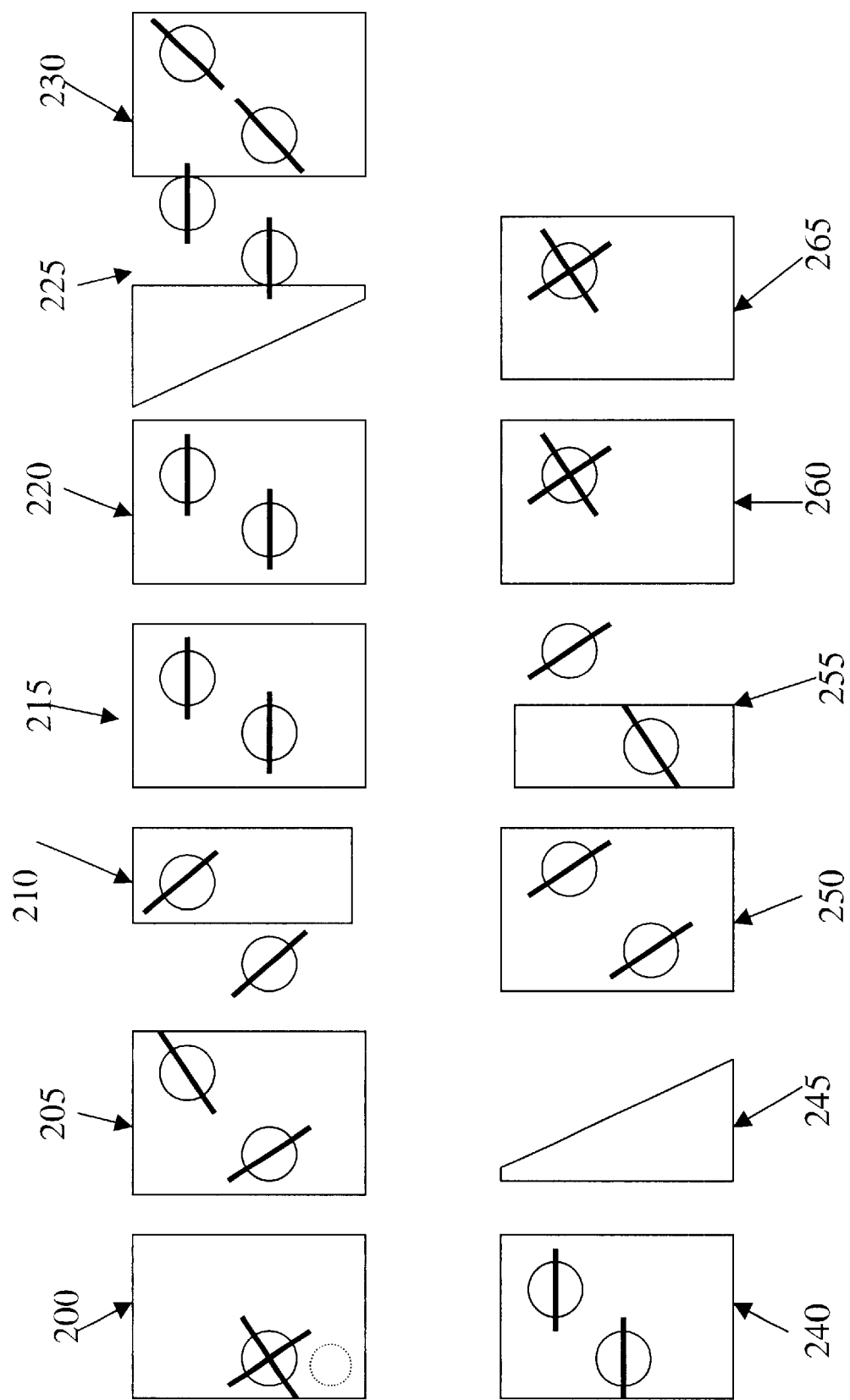
FIG. 2 is a forward path through an circulator as illustrated in FIG. 1.

FIG. 2 is a forward light path through an optical circulator as illustrated in FIG. 1. FIG. 2 illustrates the effects of the element described on the optical signal(s) described. In other words, the elements of FIG. 2 indicate the orientation of the optical signals at the output of the respective circulator elements. For example, illustration of a half wave plate indicates the orientation of one or more optical signals after passing through the half wave plate.

Input port 200 receives an optical input signal. In one embodiment, input port 200 is a dual-fiber collimator; however, other configurations can also be used. For example, two adjacent modified or non-modified collimators can also provide input port 200. The dashed line in input port 200 corresponds to an output port, for example, of a dual-fiber collimator. The optical signal received through input port 200 includes both horizontally polarized and vertically polarized components.

Walk-off crystal 205 separates the input signal into two polarized light signals having 45° and −45° orientations separated by a predetermined distance. In the embodiment of FIG. 2, one signal is illustrated as being disposed above and to the right of the original position of the input signal; however, other separations can also be provided by walk-off crystal 205. Half wave plate 210 rotates one of the polarized light signals 90° counterclockwise. The two polarized optical signals then have the same polarization.

Faraday rotator 215 rotates both polarized optical signals 45° counterclockwise so that both signal are horizontally polarized. Alternative components can be used to generate two horizontally polarized optical signals corresponding to the input signal, for example, two split Faraday rotators, one of which rotates a signal positive 45° and the other that rotates the other signal −45°. Walk-off crystal 220 operates on vertically polarized optical signals. Thus, the horizontally polarized optical signals are passed by walk-off crystal 220. Similarly, birefringent wedge 225 does not affect horizontally polarized light.

Faraday rotator 230 is a non-reciprocal component that rotates both polarized optical signals 45° counterclockwise. Half wave plate 240 is a reciprocal component that rotates both polarized optical signals 45° clockwise. Birefringent wedge 245 does not affect horizontally polarized light, so the horizontally polarized light output by half wave plate 240 is passed to half wave plate 250.

Half wave plate 250 is a reciprocal component that rotates the two polarized optical signals 45° clockwise. Half wave plate 255 rotates one of the polarized optical signals 90° clockwise. Walk-off crystal 260 combines the two polarized optical signals to a single output signal corresponding to the input signal received at input port 200. The output signal is output to output port 265. In one embodiment, output port 265 is a single-fiber collimator; however, other components can also be used.

Figure 3:
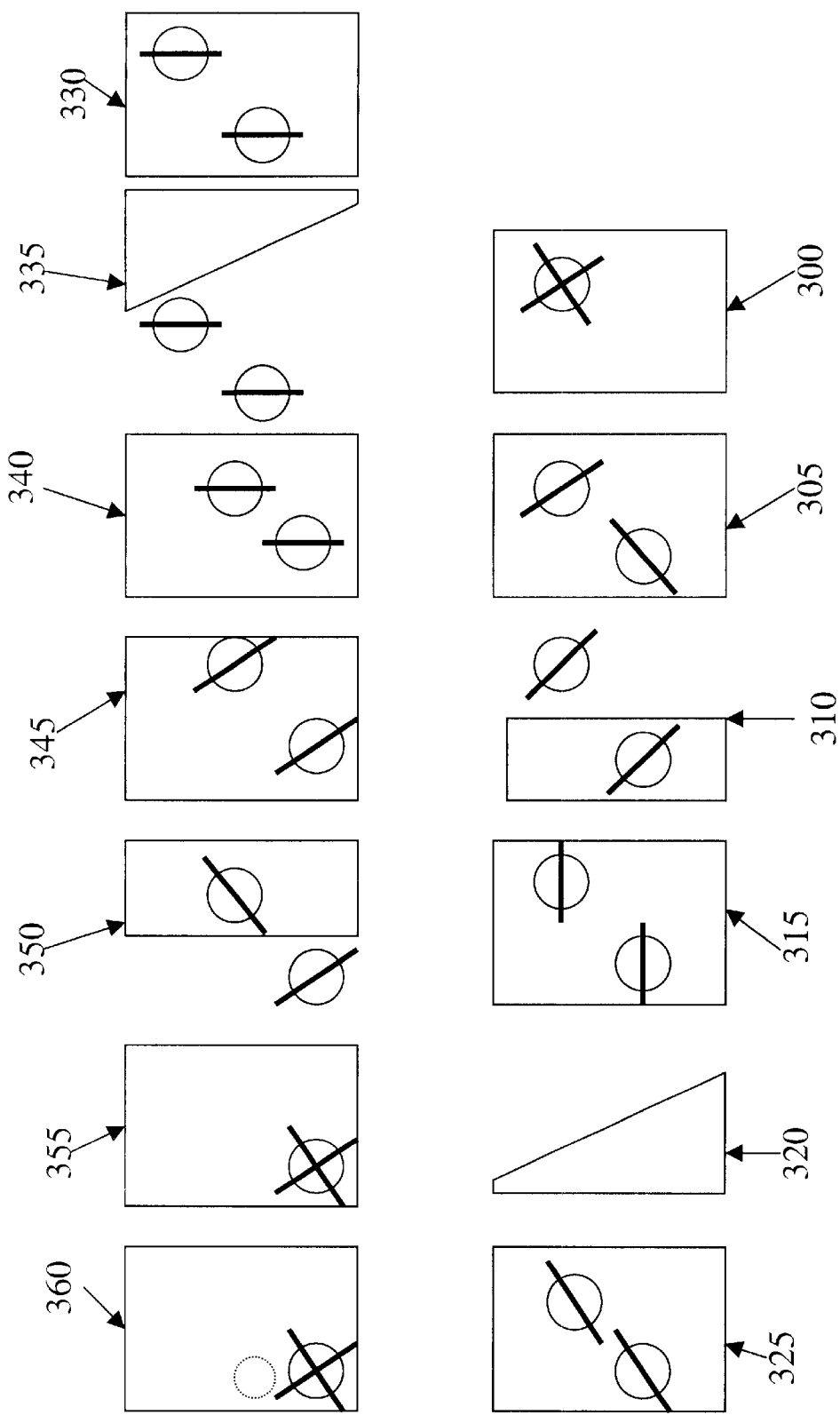
FIG. 3 is a backward path through an optical circulator as illustrated in FIG. 1.

FIG. 3 is a backward light path through an optical circulator as illustrated in FIG. 1. As with FIG. 2, FIG. 3 illustrates the effects of the element described on the optical signal(s) described. However, because signals are traveling in the opposite direction in FIG. 3 (e.g., collimator 165 to collimator 105, in FIG. 1), the illustrations of FIG. 3 refer to the opposite side of the respective components as compared to FIG. 2.

Input port 300 receives an optical input signal. In one embodiment, input port 300 is a single fiber collimator, as described above; however, other components can also be used to provide input signals to the circulator. Walk-off crystal 305 separates the input signal into two polarized optical signals having polarizations of 45° and −45°, separated by a predetermined displacement. Half wave plate 310 rotates one of the two polarized signals 900 counterclockwise. Half wave plate 315 rotates both of the polarized optical signals 45° counterclockwise.

The combination of components including birefringent wedge 320, half wave plate 325, Faraday rotator 330, and birefringent wedge 335 change the angle of the optical signals that pass from input port 300 to output port 340. In one embodiment, the angle is 3.8°, however, other angles (e.g., 1.8°, 2°, 2.5°, 3°) can also be used. The angle is determined based on the distance between the adjacent input and output ports (e.g., the distance between the centers of the input and output fibers of dual-fiber collimator 105) and the focal distance between birefringent wedge 335 and output port 340. In one embodiment, the distance, d, between the ports is 125 μm and the focal distance, f, is 2000 μm; however, other distances can also be used.

Half wave plate 325 rotates the two polarized optical signals 45° counterclockwise and Faraday rotator 330 rotates the two polarized optical signals 45° further counterclockwise. Thus, the optical signals passed to birefringent wedge 335 are vertically polarized. Because the optical signals received by birefringent wedge 335 are vertically polarized, the reflection index for the vertically polarized signals is different than for the horizontally polarized signals that pass from half wave plate 340 to Faraday rotator 330.

In one embodiment, birefringent wedge 335 deflects the vertically polarized optical signals by 1.8°. The deflected optical signals pass through walk-off crystal 340 to Faraday rotator 345, which rotates the optical signals 45° counterclockwise. Half wave plate 350 rotates one of the optical signals 90° clockwise. Walk-off crystal 355 combines the two optical signals into an output signal. Because of the deflection of the optical signals passing in the backward direction, the output optical signal is directed to a different fiber of the output port 360 than optical signals that are received and passed in the forward direction.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A polarization independent optical circulator comprising:
    a first port for directing an optical signal to a second port the second port for directing an optical signal to a third port;
    polarization diversity means associated with the first, second and third ports for dividing the optical signal into two polarized optical signals and for combining two polarized optical signals of light, and for rotating a polarization of at least one of the two polarized optical signals; and
    means for aligning the signal from the first port to the second port and from the second port with the third port, for passing polarized optical signals traveling in a first direction having a first polarization without changing an optical path of the signals, and for changing an angle of the optical path for polarized optical signals traveling in a second direction having a second orthogonal polarization including:
        a first birefringent wedge;
        a second birefringent wedge; and
        a non-reciprocal optical element between the first birefringent wedge and the second birefringent wedge.

2. The polarization independent optical circulator of claim 1 wherein the non-reciprocal optical element comprises a half wave plate and a Faraday rotator.

3. The optical circulator of claim 2 wherein the half wave plate has an azimuth angle in the range of 15° to 25°.

4. The optical circulator as defined in claim 3 further including a walk-off crystal to pass polarized optical signals traveling in the first direction having a first polarization without changing an optical path of the signals, and to change an angle of the optical path for polarized optical signals traveling in the second direction having a second orthogonal polarization, after passing through the means for aligning the signal.

5. The polarization independent optical circulator of claim 1 wherein the polarization diversity means comprises:
    a plurality of walk-off crystals for dividing optical signals directed from the first and second ports into two polarized optical signals of orthogonal polarizations and for combining two polarized optical signals of light by polarization for coupling into the second and third ports; and
    a plurality of half wave plates for rotating a polarization of at least one of the two polarized optical signals.

6. The optical polarization independent optical circulator of claim 5 wherein the plurality of half wave plates comprises first and second half wave plates having a first azimuth angle for rotating a polarization of one of the two polarized optical signals relative to the other of the two polarized optical signals, and a third half wave plate having a second azimuth angle for orienting a polarization of two polarized optical signals to change an angle of the optical path for signals traveling in the second direction through the means for aligning the signal, or for orienting a polarization of two polarized optical signals for combining two polarized optical signals in a walk-off crystal.

7. The optical circulator of claim 6 wherein the first azimuth angle is in the range of 40° to 60°.

8. The optical circulator of claim 6 wherein the second azimuth angle is in the range of 15° to 25°.

9. The optical circulator as defined in claim 5 further including a Faraday rotator for rotating a polarization of at least one of two polarized optical signals.

10. The optical circulator of claim 1 wherein the first birefringent wedge and the second birefringent wedge change the optical path by an angle of between 1° and 5° with respect to a corresponding input optical signal.

11. The optical circulator of claim 10 wherein the angle is 1.8°.

12. The optical circulator of claim 1 wherein the first port and the third port comprise a single dual-fiber collimator.

13. The optical circulator of claim 1 wherein the non-reciprocal optical element is rotatatable to tune the optical circulator.

14. A polarization independent optical circulator comprising:
    a first port for directing an optical signal to a second port, the second port for directing an optical signal to a third port, the first and third ports supported on a single collimator; and the second port supported on a separate collimator;
    a first beam splitting walk off crystal and a second beam splitting walk off crystal for splitting the optical signal from the first port or second port into two orthogonally polarized signals and for combining two orthogonally polarized signals;
    a polarization rotator associated with each beam splitting walk off crystal for rotating a polarization of one of the two polarized optical signals passing from each of the beam splitting walk off crystals to match a polarization of the other of the two signals, and for rotating a polarization of one of the two signals passing into each of the beam splitting walk off crystals to be orthogonal to the other of the two signals; and,
    an assembly between the polarization rotators including a first birefringent wedge, a half wave plate, a Faraday rotator, and a second birefringent wedge for passing the two polarized optical signals in a first polarization state without affecting the angle of the signals in a first direction, and for changing the angle of the two polarized optical signals passing in a second polarization state between ports in a second direction.

15. A polarization independent optical circulator as defined in claim 14 further comprising a Faraday rotator and a walk off crystal associated with one of the beam splitting walk off crystals for rotating a polarization state of both signals and for passing the signals in the first direction and for changing the optical path in the second direction.

16. A polarization independent optical circulator as defined in claim 15, wherein the half wave plate and the Faraday rotator within the assembly provide a rotation of zero degrees in the first direction and a rotation of 90 degrees in the second direction.

17. A polarization independent optical circulator as defined in claim 16, wherein the first and second beam splitting walk off crystals each comprise a 45 degree walk off crystal and the polarization rotators comprise half wave plates having azimuth angles of 45 degrees with respect to the optical signals passing from the beam splitting walk off crystals.

18. A polarization independent optical circulator as defined in claim 17 further comprising a third half wave plate having an azimuth angle of 22.5 degrees associated with one of the beam splitting walk off crystals.

* * * * *

UNITED STATES PATENT AND TRADEMARK OFFICE
CERTIFICATE OF CORRECTION

PATENT NO.     : 6,445,499 B1
DATED          : September 3, 2002
INVENTOR(S)    : Chang et al.

It is certified that error appears in the above-identified patent and that said Letters Patent is hereby corrected as shown below:

<u>Column 3,</u>
Line 19, "embodiment in the range of" should read -- embodiment, birefringent wedge 145 changes the angle of signals passing from collinator 165 to 105 in the range of --

Signed and Sealed this

Twenty-first Day of January, 2003

JAMES E. ROGAN
*Director of the United States Patent and Trademark Office*